United States Patent [19]

Matsuda et al.

[11] Patent Number: 5,132,384

[45] Date of Patent: Jul. 21, 1992

[54] OPTICAL MATERIAL OF LOW SPECIFIC GRAVITY AND EXCELLENT IMPACT RESISTANCE, OPTICAL MOLDING PRODUCT USING THE OPTICAL MATERIAL AND MANUFACTURING METHOD THEREOF

[75] Inventors: Tatsuhito Matsuda, Kobe; Yasaki Funae, Osaka; Masahiro Yoshida, Osaka; Tetsuya Yamamoto, Osaka; Manabu Takemura, Osaka, all of Japan

[73] Assignee: Nippon Shokubai Co., Ltd., Osaka, Japan

[21] Appl. No.: 616,595

[22] Filed: Nov. 21, 1990

[30] Foreign Application Priority Data

| Nov. 22, 1989 | [JP] | Japan | 1-302093 |
| Nov. 24, 1989 | [JP] | Japan | 1-303395 |
| Nov. 30, 1989 | [JP] | Japan | 1-309079 |
| Dec. 4, 1989 | [JP] | Japan | 1-313508 |
| Apr. 2, 1990 | [JP] | Japan | 2-84819 |
| Jun. 6, 1990 | [JP] | Japan | 2-146166 |

[51] Int. Cl.$^5$ .......................... C08F 236/02
[52] U.S. Cl. .................. 526/321; 351/159; 351/160 R; 351/160 H; 523/106; 523/107; 526/279; 526/320; 526/322; 526/324; 526/325; 526/327; 526/329.2; 359/642; 359/831; 385/141
[58] Field of Search ............ 526/279, 320, 321; 523/106, 107

[56] References Cited

U.S. PATENT DOCUMENTS

| 4,138,300 | 2/1979 | Kaetsu | 526/273 |
| 4,528,301 | 7/1985 | Upchurch | 523/107 |
| 4,616,045 | 10/1986 | Upchurch | 522/60 |
| 4,743,106 | 5/1988 | Novicky | 351/160 R |
| 4,871,785 | 10/1989 | Froix | 523/106 |
| 4,918,152 | 4/1990 | Moritani et al. | 526/262 |

FOREIGN PATENT DOCUMENTS

| 59-136309 | 8/1984 | Japan . |
| 59-136310 | 8/1984 | Japan . |
| 59-136311 | 8/1984 | Japan . |
| 60-28412 | 2/1985 | Japan . |
| 64-79208 | 3/1989 | Japan . |

*Primary Examiner*—Joseph L. Schofer
*Assistant Examiner*—Fred Zitomer
*Attorney, Agent, or Firm*—Oblon, Spivak, McClelland, Maier & Neustadt

[57] ABSTRACT

The present invention discloses an optical material having excellent transparency, impact resistance and heat resistance and having a low specific gravity and a high refractive index comprising a resin obtained by radical polymerization of specific difunctional (meth)acrylate (A) and aromatic vinyl monomer (B) and, if necessary, polymerizable monomer (C) copolymerizable with the ingredients (A), or (B) or by radical polymerization of the ingredients (A), (B) and (C) under the presence of a radical polymerizable or not-radical polymerizable compound having alkoxysilyl group, epoxy group, alcoholic hydroxy group or carboxyl group in the molecule, an optical molding product comprising the optical material, as well as production process therefor. The optical molding product is utilized as for ophthalmic lenses or lenses for various kinds of optical equipments, prisms, optical fibers, optical waveguides and optical discs.

6 Claims, No Drawings

OPTICAL MATERIAL OF LOW SPECIFIC GRAVITY AND EXCELLENT IMPACT RESISTANCE, OPTICAL MOLDING PRODUCT USING THE OPTICAL MATERIAL AND MANUFACTURING METHOD THEREOF

BACKGROUND OF THE INVENTION

1. Field of the Invention

The present invention concerns an optical material of excellent transparency, heat resistance and impact resistance, having low specific gravity, and reduced weight. The invention provides a molding product of high refractive index, an optical molding product using such an optical material and a method of manufacturing thereof. The optical molding product according to the present invention is useful as various kinds of lenses used for optical instruments or spectacles and, in addition, as prisms, optical waveguides, disc substrate or the like.

2. Description of the Prior Art

Materials used to produce optical members such as lenses, prisms, optical waveguides and disc substrates need to be colorless and transparent. Furthermore, by reason of their reduced weight, (satisfactory) impact resistance, moldability or dyeability, transparent synthetic resins have attracted attention as a substitute for inorganic optical material.

Various characteristics are required for transparent synthetic resins as optical materials in addition to the above, and the refractive index is extremely important among them. For example, transparent synthetic resins having a high refractive index, when used as lenses, can be rendered thinner than materials having low refractive indexes to give the same focal distance. Accordingly, it can reduce the volume of space occupied by lenses in optical assemblies thereby reducing the weight and minimizing the size of optical apparatuses. Furthermore, since transparent synthetic resins have excellent impact resistance as compared with inorganic optical materials such as glass, they can be considered also excellent in durability.

Diethylene glycol bisallyl carbonate resin, polymethylmethacrylate and polycarbonate have been generally known as resins to be used for the optical material such as plastic lenses. However, since the diethylene glycol bisallyl carbonate resin and the polymethylmethacrylate have low refractive indices of 1.49 to 1.50, when these resins are molded into plastic lenses, they bring about a drawback that a center thickness, an edge thickness and a curvature of the lens become greater as compared with those of inorganic optical glass lenses. Further, although the polycarbonate resin has a high refractive index of 1.58 to 1.59, it is liable to cause birefringency in molding and thus is defective in optical homogeneity. Moreover, because polymethylmethacrylate and polycarbonate are thermoplastic resins of non-crosslinked structures, the resins are fused during cutting or grinding and they can not be considered satisfactory as materials for ranges in precision optical machinery, optical elements or ophthalmic lenses.

To remedy the above drawbacks of the thermoplastic resins, a method has been so far known which produces resins having a crosslinked structure using ethylene glycol dimethacrylate as a crosslinking agent (Japanese Laid-Open Patent Application No. 64691/1974), but the resin of such a cross-linked structure has low impact resistance.

Further, there is also a method of manufacturing a resin of a crosslinked structure by using trimethylol propane tri(meth)acrylate (Japanese Laid-Open Patent Application No. 291841/1988) but the resin material can not be put to practical use as the optical material since it has a poor transparency being prepared by curing with dispersed metal oxide hydrates.

Further, Japanese Laid-Open Patent Application No. 34102/1987 discloses a styrene derivative having a halogen-substituted aromatic ring as a component having a high refractive index. However, use of the halogen-substituted styrene derivatives involves a problem that the specific gravity is increased and the weather proofness is poor as the optical material.

In order to overcome the foregoing drawbacks, optical material and optical molding products using a resin of high refractive index have been developed, for example, for ophthalmic plastic lenses. For producing an optical molding product such as plastic lenses by using a resin of high refractive index, it has been adopted a cast polymerization process of conducting polymerization while casting, into a molding die, a polymerizable ingredient having halogen atoms such as chlorine or bromine atoms; nitrogen atom-containing ingredient such as urethane; sulfur atom-containing ingredient such as thiol; or an aromatic ring or the like in the molecule, for example, vinyl monomer, prepolymer or (poly) condensation type monomer.

However, the method of producing an optical molding product having a high refractive index by the cast polymerization of the polymerizable ingredient described above shows a poor molding yield as compared with the case of using the allyl carbonate or the like as the material. Generally, the polymerizable ingredients as described above involve a difficulty that the control of polymerization is difficult compared with allyl carbonate, strains are left in the optical molding product and thus the adhesion between it and the mold becomes insufficient and the ingredients separate off the molding die.

SUMMARY OF THE INVENTION

The present invention has been accomplished taking notice of the foregoing problems in the prior art and it is an object thereof to provide a novel optical material having excellent transparency, heat resistance and impact resistance, a low specific gravity and reduced weight and, in addition, having a high refractive index and of excellent optical property. Another object of the present invention is to provide an optical molding product comprising the foregoing optical material and excellent in transparency, heat resistance and impact resistance, as well as optical properties. A further object of the present invention is to provide a process capable of producing the optical material and the optical molding product efficiently. Other objects of a present invention will become apparent by the following descriptions.

Among the objects as described above, the optical material can be obtained by radical copolymerization of a mixture of polymerizable monomers comprising:

(A) from 30 to 80% by weight of one or more difunctional (meth)acrylates represented by the following general formula (fA), (B) from 20 to 70% by weight of one or more aromatic vinyl monomers and (C) from 0 to 50% by weight of one or more polymerizable oligomers or monomers, each of which has a polymerizable double bond and a molecular weight of not less than 98, excepting the compounds of (A) and (B), General formula:

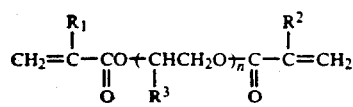
(fA)

where $R^1$, $R^2$ and $R^3$ represent respectively and independently H or $CH_3$ and n is an integer of 3 to 18, or by radical copolymerization of the ingredients (A), (B) and (C) described above under the presence of the following ingredient (D) or (E):

(D) One or more polymerizable oligomers or monomers having at least one functional group selected from the group consisting of an alkoxysilyl group, epoxy group, alcoholic hydroxy group and carboxyl group and a radical polymerizable double bond in the molecule, by an amount from 0.0001 to 30 parts by weight based on 100 parts by weight of the total for the ingredients (A), (B) and (C), (E) one or more compounds having at least one of alkoxysilyl group, epoxy group, alcoholic hydroxy group and carboxyl group and not containing polymerizable double bond in the molecule, by an amount from 0.0001 to 30 parts by weight based on 100 parts by weight of the total for the ingredients (A), (B) and (C).

Further, among the foregoing objects, the optical molding product can be obtained by charging a polymerizable monomer mixture comprising the ingredients (A), (B) and (C) described above together with a radical polymerization initiator into a molding die, or charging the ingredients (A), (B) and (C) described above together with the ingredient (D) or (E) and a radical polymerization initiator into a molding die, initiating the polymerization at 20° to 60° C., polymerizing to cure them while gradually elevating the temperature to 90° to 140° C. for 8 to 48 hours.

DETAILED DESCRIPTION OF THE INVENTION

As the ingredient (A) used in the present invention, there is no particular limit so long as it is represented by the general formula (A) above, and there can be mentioned, for example, triethylene glycol di(meth)acrylate, tetraethylene glycol di(meth)acrylate, nonaethylene glycol di(meth)acrylate, tetradecaethylene glycol di(meth)acrylate and nonapropylene glycol di(meth)acrylate, one or more of them being possibly used.

The ingredient (A) is used for imparting a crosslinked structure to the optical material to improve the heat resistance for preventing fusion or clogging during cutting or grinding fabrication or adhesion of the resin material to processing tools, as well as for providing the resultant optical molding product with excellent impact resistance. For such characteristics to be developed, those having n from 3 to 18 in the general formula (A) have to be used. If n is less than 3, an effect of imparting the impact resistance is insufficient, whereas no sufficient heat resistance can be attained if it exceeds 18.

In a case of using the ingredient (A) by two or more, that is, by the number of m, "mol average (N)" of them defined by the following equation is preferably within a range from 3.2 to 10.

$$N = \sum_{i=1}^{m} \left( Ni \cdot \frac{Wi}{Mi} \right) / \sum_{i=1}^{m} \left( \frac{Wi}{Mi} \right)$$

where
Ni is a number for n in the ingredient (Ai),
Mi is a molecular weight of the ingredient (Ai),
Wi is a weight of the ingredient (Ai).

If N is less than 3.2, it is difficult to obtain a sufficient impact resistance. On the other hand, if it exceeds 10, the effect for improving the heat resistance becomes insufficient.

The ingredient (A) is used at a ratio from 30 to 80% by weight being expressed by the amount based on the entire amount of the ingredients (A), (B) and (C). If it is less than 30% by weight, the crosslinking density of the resultant optical material becomes low and the effect for the improvement of the heat resistance, cutting processability, grinding processability or impact resistance becomes insufficient. On the other hand, if the amount exceeds 80% by weight, a refractive index of the resultant optical material becomes low or the polymerized curing product becomes soft to worsen the shape retainability. A more preferred blending amount for the ingredient (A) is within a range from 35 to 70% by weight.

As the ingredient (B) used in the present invention, there can be mentioned styrene and various kinds of styrene derivatives, and not halogen-substituted styrene derivatives are preferred in order to obtain an optical material of low specific gravity and excellent weather proofness. As preferred examples, there can be mentioned, styrene, α-methyl styrene and divinyl benzene. Among them, styrene and α-methyl styrene are particularly preferred.

The ingredient (B) has a function of imparting a high refractive index to the resultant optical material and the optical molding product. For developing the effect effectively, the ingredient (B) has to be used within a range from 20 to 70% by weight when expressed by the amount based on the entire amount of the ingredients (A), (B) and (C). If it is less than 20% by weight, it less contributes to the change of the refractive index of the resultant optical material. On the other hand, if it exceeds 70% by weight, the amount of the ingredient (A) used can not reach the above-specified amount to reduce the crosslinking density of the resultant optical molding product, by which the effect for the improvement of the heat resistance, cutting fabricability, grinding fabricability or impact resistance can no more be ensured. A more preferred blending amount for the ingredient (B) is within a range from 25 to 60% by weight.

The polymerizable monomer ingredient as the starting material for the optical material and the optical molding product according to the present invention may consist only of the ingredient (A) and the ingredient (B) above, but other ingredient (C) may be used as a copolymerizable ingredient with a purpose of imparting other physical properties if necessary. As the other ingredient (C) usable herein, there is no particular limit so long as it is radical copolymerizable with the ingredient (A) and the ingredient (B) above, and has a molecular weight of 98 or greater. There can be used monofunctional monomer and poly-functional monomer not corresponding to the ingredient (A) and the ingredient (B), as well as polymerizable high molecular compounds collectively referred to as oligomers. As specific examples for the ingredient (C), there can be mentioned, for example, mono-functional (meth)acrylates such as
methylmethacrylate,
butylmethacrylate,
cyclohexylmethacrylate,
4-t-butylcyclohexylmethacrylate,
2,3-dibromopropylmecharylate,
phenyl(meth)acrylate,
benzyl(meth)acrylate,
2-methacryloyloxymethylthiophene,
3-methacryloyloxymethylthiophene,
2-(2-methacryloyloxyethyl)thiophene,
2-tricyclo[5.2.1.0$^{2,6}$]-3-decenyloxyethylmethacrylate,
methyl-2-chloroacrylate,
methyl-2-bromoacrylate,
cyclohexyl-2-chloroacrylate,
cyclohexyl-2-bromoacrylate,
2-tricyclo[5.2.1.0$^{2,6}$]-3-decenyloxyethyl-2-chloro acrylate;
poly-functional (meth)acrylates such as
ethylene glycol di(meth)acrylate,
diethylene glycol di(meth)acrylate,
1,3-butylene glycol di(meth)acrylate,
1,4-butylene glycol di(meth)acrylate,
1,6-hexanediol di(metha)acrylate; and
(meth)allyl esters, allyl carbonates and allyl ethers such as (meth)allyl benzoate, di(meth)allyl phthalate, diethylene glycol bisallyl carbonate, 2,2-bis(4-allyloxycarbonyloxyethoxy-3,5-dibromophenyl)propane, 2,2-bis(4-allyloxy-3,5-dibromophenyl)propane; and reactive oligomers such as epoxy (meth)acrylate, polyester (meth)acrylate and urethane (meth)acrylate. Among them, (meth)acrylate type monomers are preferred in view of the copolymerizability, homogeneity and heat resistance of the resultant optical material.

In the present invention, the polymerizable monomer (C) is used for imparting various other properties than described above to the resultant optical material if necessary. However, there is a limit for the amount of use in order not to deteriorate the feature of the present invention, and it has to be kept to less than 50% by weight being expressed by an amount based on the entire amount for the ingredients (A), (B) and (C). In the present invention, use of a mono-functional polymerizable monomer having a solubility parameter (SP value) from 8.0 to 9.3 (cal/cm$^3$)$^{\frac{1}{2}}$ as at least one of the ingredients (C) is preferred since this can improve the homogeneity of the resultant optical material, and the amount of use is within a range from 5 to 30% by weight based on the entire amount for the ingredients (A), (B) and (C).

Among the ingredient (C), the mono-functional (meth)acrylates have a function of compensating the ingredient (A) and the ingredient (B) above in optionally controlling the optical index, heat resistance and moldability of the resultant optical material. Further, polyfunctional (meth)acrylates reduce the impact resistance although they further improve the heat resistance of the resultant optical material. Accordingly, when the polyfunctional (meth)acrylates are used as the ingredient (C), they are used within a range from 0.1 to 50% by weight, more preferably, from 5 to 35% by weight based on the entire amount for the ingredients (A), (B) and (C) considering the overall physical properties of the resultant optical material.

In the present invention, it is preferred to use a polyfunctional (meth)acrylate capable of satisfying the conditions of the following relationship as at least one of the ingredient (C) since this can increase the crosslinking density of the polymerization curing product to obtain an optical material of much excellent heat resistance. However, since the material becomes too hard and the impact resistance is worsened if the amount is excessive, it is preferred to control the amount of use to less than about 30% by weight based on the entire amount for the ingredients (A), (B) and (C).

$$85 \leq MW/r \leq 128$$

where
MW is a molecular weight of the poly-functional (meth)acrylate,
r is the number of the polymerizable functional groups in the poly-functional (meth)acrylate.

Further, when the poly-functional (meth)acrylates are used as the ingredient (C), a preferred amount of the ingredient (C) other than the ingredient (A), the ingredient (B) and the poly-functional (meth)acrylate is from 30 to 75% by weight, 20 to 65% by weight and 0 to 20% by weight respectively based on the entire amount for the ingredients (A), (B) and (C).

Further, (meth)allyl esters, allyl carbonates and allyl ethers are effective for suppressing the polymerization reactivity of the polymerizable monomer mixture and they particularly have an effect of improving the production yield in the cast polymerization and the effect can be developed effectively by incorporating them in an amount from 0.1 to 30% by weight, more preferably, from 0.5 to 20% by weight based on the entire amount for the ingredients (A), (B) and (C). Further, among the ingredient (C), the reactive oligomers such as polyester (meth)acrylate and urethane (meth)acrylate have an effect of moderating the shrinkage upon polymerization and are effective for improving the production yield in the cast polymerization, and the effect can be developed effectively by using them in an amount from 1 to 35% by weight, preferably, from 5 to 30% based on the entire amount for the ingredients (A), (B) and (C).

It may be considered to use acryronitrile or methacrylonitrile as the ingredient (C), they have a molecular weight of less than 98 and low boiling point and may cause a risk of forming void defects in the optical material by boiling in the cast polymerization described later and, accordingly, those having a molecular weight of less than 98 should not be used in the present invention.

The optical material according to the present invention can be obtained by radical polymerization of a polymerizable monomer mixture containing the ingredient (A) and the ingredient (B) above as the essential ingredient and, further, containing the ingredient (C) above if necessary.

Then, when cast polymerization is conducted by adding a polymerization initiator to the polymerizable monomer mixture of the specific composition described above, it is polymerized and at the same time cured in the molding die to obtain an optical molding product.

By the way, polymerization for the monomer ingredient containing a vinylic monomer is difficult for the polymerization control as compared with the case of polymerizing an allyl type compound, because the generation of heat by polymerization is great and the polymerization proceeds excessively in a short period of time sometime failing to satisfy the optical property of the lens or the like and, more in particular, because a problem caused by internal distortion during polymerization and incomplete transfer due to separation of the lens or the like from the mold forming face is liable to occur.

However, when a polymerizable monomer (D) having at least one alkoxysilyl group, epoxy group, alcoholic hydroxy group and carboxyl group and a polymerizable double bond in the molecule (it may sometime be referred to hereinafter the polymerizable monomer having the alkoxysilyl group as the ingredient ($D_S$), a polymerizable monomer having the epoxy group as the ingredient ($D_E$), the polymerizable monomer having the alcoholic hydroxy group as the ingredient ($D_A$) and the polymerizable monomer having the carboxyl group as the ingredient ($D_C$)) is used in addition to the ingredients (A), (B) and (C), by an amount from 0.001 to 30 parts by weight on 100 parts by weight for the sum of the ingredients (A), (B) and (C), the adhesion between the mold and the optical molding product can be improved to enhance the molding accuracy and the molding yield of the optical molding product. In particular, the ingredient ($D_S$) having the alkoxysilyl group can provide the foregoing effect remarkably when using a glass mold and can improve the adhesion between the mold and the optical material with a little amount of addition.

The ingredient ($D_S$) having the alkoxysilyl group used herein collectively includes generally those known as silane coupling agents that have a radical polymerizable double bond in the molecule and there can be mentioned, for example, a polymerizable silane coupling agent such as 3-methacryloyloxypropyl trimethoxysilane, vinyl trimethoxysilane and vinyl triethoxysilane.

The ingredient ($D_S$) having the alkoxysilyl group can effectively provide the effect when used by an amount more than 0.0001 parts by weight based on 100 parts by weight of the sum for the ingredients (A), (B) and (C). Since the adhesion of the optical material to the mold is excessively strong making the mold release difficult if it is used too much, it is preferably controlled to less than 0.5 parts by weight. A more preferred amount of the ingredient ($D_S$) having the alkoxysilyl group used is within a range from 0.001 to 0.2 parts by weight.

As the ingredient ($D_E$) having the epoxy group in the molecule, glycidyl (meth)acrylate can be mentioned as a typical example. The ingredient ($D_E$) having such an epoxy group can effectively provide its effect when blended by more than 0.1 parts by weight based on the sum for the ingredients (A), (B) and (C). Since the adhesion of the optical material to the mold becomes excessively strong when the amount is too much making the mold release difficult, it is preferably controlled to less than 20 parts by weight. A more preferred blending amount of the ingredient ($D_E$) is from 1 to 10 parts by weight.

As the ingredient ($D_A$) having the alcoholic hydroxy group in the molecule includes those having an alcoholic hydroxy group and a polymerizable double bond, for example, (meth)acryloyl group, allyl group or vinyl group in the molecule and, in particular, a polymerizable monomer having a secondary or tertiary alcoholic hydroxyl group is preferred.

There can be mentioned specific examples, for example, polymerizable monomer having a primary alcoholic hydroxy group such as
allyl alcohol,
2-hydroxyethyl (meth)acrylate,
diethylene glycol mono(meth)acrylate,
polyethylene glycol mono(meth)acrylate,
polypropylene glycol mono(meth)acrylate,
4-hydroxybutyl (meth)acrylate,
6-hydroxyhexyl (meth)acrylate,
trimethylolpropane mono(meth)acrylate,
trimethylolpropane di(meth)acrylate,
pentaerythritol tri(meth)acrylate,
trimethylolpropane monoallyl ether and
trimetylolpropane diallyl ether;
polymerizable monomer having secondary or tertiary alcoholic hydroxy group such as
2-hydoxypropane (meth)acrylate,
2-hydroxybutyl (meth)acrylate,
3-chloro-2-hydroxypropyl (meth)acrylate,
2-hydroxy-3-phenoxypropyl (meth)acrylate,
2-hydroxy-3-(meth)acroyloxypropyl (meth)acrylate,
1,2-bis(2-hydroxy-3-(meth)acryloyloxypropoxy)ethane,
1,2-bis(2-hydroxy-3-(meth)acryloyloxypropoxy)propane,
1,3-bis(2-hydroxy-3-(meth)acryloyloxypropoxy)propane, and
2,2-bis[4-(2-hydroxy-3-(meth)acryloyloxypropoxy)-3,5-dibromophenyl]propane;
and polymerizable monomer having primary and secondary or tertiary alcoholic hydroxy groups such as 2,3-dihydroxypropyl (meth)acrylate.

The ingredient ($D_A$) having the alcoholic hydroxy group can provide an effective effect being blended by more than 0.1 parts by weight based on 100 parts by weight of the sum for the ingredients (A), (B) and (C). However, since the adhesion of the molding product to the mold is excessively strong, making the mold release difficult if the amount is too much, it is preferred to control the amount to less than 20 parts by weight. A more preferred blending amount of the ingredient ($D_A$) is from 1 to 10 parts by weight.

Then, as the ingredient ($D_C$) having the carboxyl group in the molecule can include those having a polymerizable double bond, for example, (meth)acryloyl, allyl group and vinyl group together with the carboxyl group in the molecule and there can be mentioned as a specific example, for example, acrylic acid, methacrylic acid, fumaric acid, maleic acid, succinic acid, itaconic acid, methaconic acid, citraconic acid, oleic acid, linolic acid, linolenic acid and ercaic acid.

The ingredient ($D_C$) having the carboxyl group can effectively provide an effect being blended by more than 0.1 parts by weight based on 100 parts by weight of the sum for the ingredients (A), (B) and (C).

However, since the adhesion of the molding product to the mold is excessively strong to make the mold release difficult if the amount is too much, it is preferred to control the amount to less than 10 parts by weight. A more preferred blending amount of the ingredient ($D_A$) is from 0.5 to 8 parts by weight.

As has been described above, in the present invention, the adhesion between the molding product and the mold can be increased to improve the molding accuracy by using the polymerizable monomer ($D_S$) having the alkoxysilyl group, the polymerizable monomer ($D_E$) having the epoxy group, the polymerizable monomer ($D_A$) having the alcoholic hydroxy group or the polymerizable monomer ($D_C$) having the carboxyl group together with the ingredients (A), (B) and (C).

In the present invention, when a compound (E) having an alkoxysilyl group, epoxy group, alcoholic hydroxy group or carboxyl group and not having a polymerizable double bond in the molecule (it may be sometime referred to hereinafter the compound having the alkoxysilyl group as the ingredient (E$_S$), the compound having epoxy group as the ingredient (E$_E$), the compound having the alcoholic hydroxy group as the ingredient (E$_A$) and the compound having the carboxyl group as the ingredient (E$_C$)) is blended at least by one as the adhesion improving ingredient with the mold, instead of the ingredients (D$_S$), (D$_E$), (D$_A$) and (D$_C$), the same effect as described above can be obtained. As specific preferred examples having such an effect, there can be mentioned, for example, non-polymerizable silane coupling agent such as
3-glycidoxypropyltrimethoxysilane,
3-glycidoxypropymethyldimethoxysilane,
2-(3,4-epoxycyclohexyl)ethyltrimethoxysilane,
3-chloropropyltrimethoxysilane and
3-mercaptopropyltrimethoxysilane as the ingredient (E$_S$) having the alkoxysilyl group;
ethylene glycol diglycidyl ether,
polyethylene glycol diglycidyl ether,
polypropylene glycol diglycidyl ether,
2,2-bis(4-glycidoxycyclohexyl)propane,
2,2-bis(4-glycidoxyphenyl)propane,
2,2-bis[4-(glycidoxypropoxy)phenyl]propane,
2,2-bis[3,5-dibromo-4-(2-glycidoxypropoxy)phenyl]-propane as the ingredient (E$_A$) having the epoxy group;

octanol, polyethylene glycol, benzyl alcohol, s-butyl alcohol, t-butyl alcohol, cyclohexyl alcohol, 4-t-butyl cyclohexyl alcohol and 2,2-bis[4-(2-hydroxypropoxy)-phenyl]-propane as the ingredient (E$_A$) having the alcoholic hydroxy group, and valeric acid, capronic acid, enathic acid, undecanoic acid, adipic acid, benzoic acid and phthalic acid as the ingredient (E$_C$) having the carboxyl group.

The preferred amount of using each of the ingredients (E$_S$) (E$_E$), (E$_A$) and (E$_C$) having the alkoxysilyl group epoxy group, alcoholic hydroxy group or carboxyl group respectively is the same for the preferred range of the amount of use defined for the ingredients (D$_S$), (D$_E$), (D$_A$) and (D$_C$) described above respectively also together with each of the reasons for such definition.

The ingredients for the starting material for obtaining the optical material according to the present invention are as described above. If necessary, it is possible to add, as further other ingredients, an adhesion improver such as an isocyanate type compound or to add in an appropriate amount of other known additives, for example, UV-ray absorber, antioxidant, dripping inhibitor, colorant and mold releasing agent.

The optical material and the optical molding product according to the present invention can be obtained by reacting a polymerizable monomer mixture comprising the ingredient (A) and the ingredient (B) as the essential ingredient and, if necessary, further containing the ingredient (C), or a mixture further blended if necessary with the ingredient (D$_S$), (D$_E$), (D$_A$) or (D$_C$) or the ingredient (E$_S$), (E$_E$), (E$_A$) or (E$_C$) having the alkoxysilyl group, epoxy group, alcoholic hydroxy group or carboxyl group in the molecule under the presence of a radical polymerization initiator. The method of the radical polymerization is not limited in particular, and there can be mentioned as specific examples such as:

(1) a method of heat polymerization of the mixture under the presence of a radical polymerization initiator, (2) a method of ultraviolet ray polymerization of the mixture under the presence of a photosensitizer, (3) a method of electron beam polymerization of the mixture.

The method (1) is a most common method in which an apparatus is simple and the radical polymerization initiator is also relatively inexpensive.

The method (2) can make a curing speed high and a polymerization time short.

The method (3) allows the polymerization in the absence of the radical polymerization initiator or the photosensitizer, making it possible to reduce the intrusion of impurities into the resin having a high refractive index.

As the specific example for the method (1), there can be mentioned known methods such as bulk polymerization, solution polymerization and suspension polymerization. Of these methods, cast polymerization capable of providing a desired shape at the same time with polymerization is preferred, for example, in the production of an optical molding product such as lenses. There can be mentioned a method of cast the polymerizable monomer mixture incorporated with the radical polymerization initiator into a glass mold and, after temperature elevation, polymerizing the mixture. In this case, for obtaining an optically homogenous optical molding product while preventing the curing product from separating off the inner surface of the mold due to the internal distortion during polymerization resulting in incomplete transfer at the optical surface, it is preferred to initiate the polymerization at 20° to 60° C. after charging to the mold and then proceed the polymerizing reaction while gradually elevating the temperature to 90°–140° C. for 8 to 48 hours. In particular, when the temperature is kept to a low temperature lower than 70° C. till the polymerizable monomer mixture is gelled and the polymerizing reaction is proceeded slowly, internal distortion during polymerization can be suppressed and separation of the product from the molding face can be prevented, making the transfer at the optical surface more complete and enabling to obtain a molding product of high optical homogeneity.

For causing gelation at the temperature lower than about 70° C., it is desirable to select the radical polymerization initiator having "10 hr half-decay temperature of less than 70° C." for at least one of the initiators to be used. As specific examples of the radical polymerization initiator decomposable at low temperature capable of satisfying such standard for the selection, there can be mentioned, preferably, peroxide type polymerization initiator such as t-butylperoxy neodecanate, t-hexylperoxy neohexanate, t-butylperoxy pivalate, 3,5,5-trimethylhexanoyl peroxide and lauroyl peroxide, and azo compound type polymerization initiator such as 2,2'-azobis(2,4-dimethylvaleronitrile), 2,2'-azobis(isobutyronitrile) and 2,2'-azobis(2-methylbutyronitrile).

The compound that is decomposed per se at a temperature higher than 70° C., but is decomposed at a temperature substantially lower than 70° C. by the combined use of a reducing agent or decomposing promotor can also be used as a preferred radical polymerization initiator in the same manner.

Furthermore, in order to reduce the residual monomer amount as low as possible at the completion of the cast polymerization, it is desirable to set the temperature at the final stage of the polymerization to 90° to 140° C. and use an initiator having "10 hr half-decay temperature exceeding 70° C." together as at least one of the radical polymerization initiators. As the radical polymerization initiator of such a high temperature decomposing property there can be mentioned, for example, peroxide type polymerization initiator such as t-butylperoxy-2-ethylhexanoate, 1,1-bis(t-butylperoxy)-3,3,5-trimethylcyclohexane, t-butylperoxylaurate and t-butylperoxy allylcarbonate and azo compound type polymerization initiator such as 1,1'-azobis (cyclohexane-1-carbonitrile) and 1-[(1-cyano-1-methylethyl)azo]-formamide.

The radical polymerization initiator is used usually within a range from 0.01 to 10% by weight, preferably, 0.05 to 5% by weight based on the polymerizable monomer mixture.

By the way, as a concrete method for producing an optical molding product by the cast polymerization, known methods such as all cast method or semi-finish method can be employed and preferred methods are exemplified as below.

That is, a mixture of the starting material ingredients and the radical polymerization initiator described above (hereinafter referred as a starting mixture) is cast into a cavity constituted with glass or metal mold and a resin gasket or adhesive tape and, after fixing, if required, by means of a spring-biased clip or the like, polymerization is conducted by applying heating to elevate temperature so as to satisfy the foregoing conditions. There is no particular limit for the material of the resin gasket or the adhesive tape so long as it has a sufficient rigidity to retain the shape of the cavity upon casting and it is preferred to use an elastic material in order to moderate stresses or distortions caused by shrinkage resulting along with the progress of polymerization.

For the spacer material referred to as a resin gasket, there can be mentioned preferably those synthetic resin materials such as of low density polyethylene, soft polyvinyl chloride, ethylene-vinyl acetate copolymer, ethylene-ethyl acrylate copolymer, polyolefinic elastomer, polyester type elastomer or polyamide type elastomer.

In the present invention, the aromatic vinyl monomer (B) is used as one of the polymerizable monomer ingredients as described above. However, the aromatic vinyl monomer (B) causes oozing of a plasticizer or low molecular weight ingredients contained in the gasket-constituent resin which brings about a problem of making the optical molding product hazy or causing the gasket to be swollen to leak a portion of the starting mixture and causing dimensional defect in the optical molding product. Accordingly, upon conducting the cast polymerization, it is preferred to clean the inner surface of the gasket (molding surface) with an organic solvent such as a saturated hydrocarbon, halogenated hydrocarbon or dimethylformamide prior to the casting of the starting mixtures thereby removing the dusts or impurities at the inner surface of the mold and previously removing the plasticizer or the low molecular weight ingredients near the molding surface. As the cleaning method, ultrasonic cleaning is most effective. Further, it is also possible to form a membrane of a thermoplastic polyamide or the like to thereby prevent the plasticizer or the less molecular weight ingredient from oozing out of the mold constituent material.

The thus obtained optical molding product has a high transparency and excellent heat resistance and impact resistance, as well as has a low specific gravity and a high refractive index, which is useful as various lenses, prisms, optical waveguides or disc substrates used for optical instruments or spectacles.

The present invention will now be described more specifically referring to examples. In the following examples, plastic lenses were selected as optical molding product.

The methods of evaluating physical properties in the following examples are as belows.

Appearance

Sheet-like polymerizates with 1.5 mm thickness or plastic lenses obtained by cast polymerization were observed visually for the hue, transparency and the state of optical surface and those which were colorless and transparent and have good surface state were indicated as "good". For those other than the above, their state were described. "Surface condition poor" indicates those in which polymer (molding product) was separated off from the molding surface of the mold making the transfer imcomplete at the lens surface.

Refractive Index and Abbe's Number

Measured by using an Abbe's refractometer in accordance with JIS K7105.

Entire Light Transmittance

Sheet-like polymer of 1.5 mm thickness obtained by cast polymerization were measured by a haze meter.

Yield

Ratio of products with good optical surface condition among 20 sheets of lenses was indicated.

Cutting Processability

Edge portions of lenses were ground by a grinder to observe the conditions. Those not showing cracks, fissures and fusions at all were indicated by a mark "o".

Heat Resistance

Lenses were put in a hot air drier at a predetermined temperature for 2 hours and deformation such as warping was observed. Those which were not deformed at all were indicated by a mark "o".

Impact Resistance

Evaluation was made in accordance with ASTM F659. Namely, a steel ball having a weight of W (g) was dropped on a lens having a center thickness of Tc (mm) from the height of H (cm) and an unbroken lens was indicated as (W×H)/Tc. Further, the impact energy in this case was calculated as a positional energy and indicated together. Further, "FDA failed" indicates a lens broken when a steel ball of 16.2 g was dropped from a height of 127 cm in accordance with ASTM F 659.

EXAMPLE 1

A starting mixture prepared by adding 0.1 parts by weight of 2,2'-azobis(2,4-dimethylvaleronitrile) to a polymerizable monomer mixture comprising 40 parts by weight of tetraethylene glycol dimethacrylate, 10 parts by weight of nonaethylene glycol dimethacrylate and 50 parts by weight of styrene was cast into a mold comprising two glass sheets and a gasket made of silicon rubber, maintained at 50° C. for 6 hours and then heated to 110° C. for 16 hours to conduct polymerization. The material was further maintained at 110° C. for two hours to conduct postpolymerization. The resultant plate-like optical material was colorless and transparent. The physical properties of the optical material are shown in Table 2 (1).

EXAMPLES 2-20 AND COMPARATIVE EXAMPLES 1-4

Plate-like optical materials were obtained by repeating the same procedures as those in Example 1 by using polymerizable monomer mixtures each of a composition shown in Table 1 (1)–(3). The physical properties of the optical material are shown in Table 2 (1)–(3).

EXAMPLE 21

A plate-like optical material was obtained by repeating the same procedures as those in Example 1 by using a starting mixture prepared by adding 0.1 parts by weight of 2,2'-azobis(isobutyronitrile), 0.05 parts by weight of 1,1'-azobis(cyclohexane-1-carbonitrile) and 2 parts by weight of 2,2-bis(4-glycidoxyphenyl) propane to a polymerizable monomer mixture comprising 50 parts by weight of tetraethylene glycol dimethacrylate, 50 parts by weight of styrene and 3 parts by weight of epoxy ester ("200PA", trade name of products manufactured by Kyoeisha Yushi Co.). The physical properties of the optical material are shown together in Table 2 (3).

EXAMPLE 22

A starting mixture prepared by adding 0.2 parts by weight of a lauroyl peroxide and 0.1 parts by weight of t-butyl peroxy-2-ethylhexanoate to a polymerizable monomer mixture comprising 40 parts by weight of tetraethylene glycol dimethacrylate, 50 parts by weight of styrene, 10 parts by weight of nonaethylene glycol dimethacrylate and 5 parts by weight of methacrylate acid was cast into the cavity of a mold prepared by a glass mold designed so as to obtain a lens with 75 mm inner diameter and −3.00 D of diopter and a gasket designed so as to have a central thickness of 1.5 mm, made of a polyolefin elastomer ("Milastomer", trade name of products manufactured by Mitsui Petrochemical Co.) and coated at the inner surface with an alcohol-soluble polyamide ("Ultraamide 1C", trade name of products manufactured by BASF Co.)

After maintaining the material in a thermostable bath at 50° C. for 4 hours, it was gradually heated to 120° C. for 15 hr and then further maintained at 120° C. for 30 min to conduct cast polymerization. Then, by removing the glass mold and the gasket from the polymerization product, a plastic lens of 75 mm diameter and −3.00 D of diopter was obtained. The optical surface condition of the resultant plastic lens was satisfactory and the physical properties for the lens were excellent as shown in Table 4 (1).

EXAMPLES 23-36

Plastic lenses were obtained by repeating the same procedures as those in Example 22 by using polymerizable monomer mixtures each of the composition shown in Table 3 (1), (2), polymerization initiators and the gaskets shown below. The physical properties of the resultant plastic lenses were excellent as shown in Table 4 (1), (2).

Gasket A: Gasket made of polyolefin elastomer ("Milastomer", trade name of products manufactured by Mitsui Petrochemical Co.) coated at the inner surface with alcohol-soluble polyamide ("Ultraamide 1C", trade name of products manufactured by BASF Co.)

Gasket B: Gasket made of ethylene-vinyl acetate copolymer coated at the inner surface with alcohol-soluble polyamide ("Ultraamide 1C", trade name of products manufactured by BASF Co.)

Gasket C: Gasket made of low density polyethylene ("Excellen" trade name of product manufactured by Sumitomo Chemical Co.) subjected to ultrasonic wave cleaning in n-heptane for 5 min.

Gasket D: not-treated gasket made of ethylene-vinyl acetate copolymer.

COMPARATIVE EXAMPLE 5-9

Comparative examples were obtained by repeating the same procedures as those in Example 22 by using polymerizable monomer mixtures each of the composition shown in Table 3 (2), polymerization initiators and the gasket. The physical properties of the comparative lenses are as shown in Table 4 (2) and did not satisfy the properties required as the lens.

Abbreviations for the compounds shown in the following Table 1 (1)–(3), Table 2 (1)–(3), Table 3 (1), (2) and Table 4 (1), (2) are as shown in below.

(A): Difunctional (meth)acrylate (A)
(B): Aromatic vinyl monomer (B)
(C): Polymerizable monomer (C) other than (A) and (B)
($D_C$): polymerizable monomer having carboxyl group and polymerizable double bond in the molecule
($D_S$): polymerizable monomer having alkoxysilyl group and polymerizable double bond in the molecule
($D_E$): polymerizable monomer having epoxy group and polymerizable double bond in the molecule
($D_A$): polymerizable monomer having alcoholic hydroxy group and polymerizable double bond in the molecule
(E): a compound having carboxyl group, alkoxysilyl group, epoxy group or alcoholic hydroxy group and not having a polymerizable double bond in the molecule
EG: ethylene glycol dimethacrylate
3EG: triethylene glycol dimethacrylate
4EG: polyethylene glycol #200 dimethacrylate (manufactured by Shin Nakamura Kagaku Co.)
4EG': polyethylene glycol #200 diacrylate (manufactured by Shin Nakamura Kagaku Co.)
9EG: polyethylene glycol #400 dimethacrylate (manufactured by Shin Nakamura Kagaku Co.)
9PG: polypropylene glycol #400 dimethacrylate (manufactured by Shin Nakamura Kagaku Co.)
14EG: polyethylene glycol #600 dimethacrylate (manufactured by Shin Nakamura Kagaku Co.)
23EG: polyethylene glycol #1000 dimethacrylate (manufactured by Shin Nakamura Kagaku Co.)
St: styrene
α-St: α-methyl styrene
BzMA: benzyl methacrylate
MMA: methyl methacrylate
BG: 1,3-butylene glycol dimethacrylate
ADC: diethylene glycol bisallyl carbonate
MAA: methacrylic acid
AA: acrylic acid
MOPS-M: 3-methacryloyloxypropyl trimethoxysilane
CPS-M: 3-chloropropyl trimethoxysilane
GMA: glycidyl methacrylate
GPP: 2,2-bis(4-glycidoxyphenyl)propane
HEMA: 2-hydroxyethyl methacrylate
BPPP: 2,2-bis[4-(2-hydroxypropoxy)phenyl]propane 40EM: 1,2-bis(2-hydroxy-3-methacryloyloxypropoxy)ethane (trade name of products manufactured by Koyoeisha Yushi Co.)

200PA:

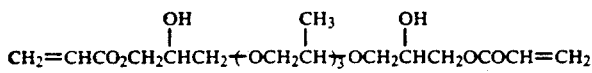

(trade name of products manufactured by Koyoeisha Yushi Co.)

V65: 2,2'-azobis(2,4-dimethylvalelonitrile)
V60: 2,2'-azobis(isobutyronitrile)
V40: 1,1'-azobis(cyclohexane-1-carbonitrile)
IPP: isopropylperoxy dicarbonate
LPO: lauroyl peroxide
BEH: t-butylperoxy-2-ethylhexanoate

TABLE 1

| Example | Polymerization monomer (parts by weight) (A) | Mol average for (A) | (B) | Polymerization initiator (parts by weight) |
|---|---|---|---|---|
| 1 | 4EG(40) 9EG(10) | N = 4.65 | St(50) | V65(0.1) |
| 2 | 4EG(40) 14EG(10) | N = 4.97 | St(50) | V65(0.1) |
| 3 | 4EG(40) 9PG(10) | N = 4.54 | St(50) | V65(0.1) |
| 4 | 3EG(40) 9EG(10) | N = 3.69 | St(50) | V65(0.1) |
| 5 | 4EG'(40) 9EG(10) | N = 4.60 | St(50) | V65(0.1) |
| 6 | 4EG(50) | N = 4 | St(50) | V65(0.1) |
| 7 | 4EG(40) | N = 4 | St(60) | V65(0.1) |
| 8 | 3EG(30) 9EG(20) | N = 4.54 | St(50) | V65(0.1) |
| 9 | 3EG(30) 14EG(20) | N = 5.18 | St(50) | V60(0.1) V40(0.05) |
| 10 | 3EG(45) 4EG(20) | N = 3.28 | St(35) | V60(0.1) V40(0.05) |

| Example | Polymerizable monomer (parts by weight) (A) | Mol average for (A) | (B) | (C) | Polymerization initiator (parts by weight) |
|---|---|---|---|---|---|
| 11 | 4EG(40) | N = 4 | St(50) | MMA(10) | V65(0.1) |
| 12 | 4EG(40) 9EG(10) | N = 4.65 | St(40) | BzMA(10) | V65(0.1) |
| 13 | 4EG(40) | N = 4 | St(40) α-St(10) | BG(10) | V65(0.1) |
| 14 | 4EG(40) | N = 4 | St(40) α-St(10) | ADC(10) | LPO(0.2) V40(0.1) |
| Comp. Example 1 | 4EG(70) | N = 4 | — | MMA(30) | V65(0.1) |
| Comp. Example 2 | — | — | St(70) | MMA(30) | V65(0.1) |
| Comp. Example 3 | — | — | — | ADC(100) | IPP(2.5) |
| Comp. Example 4 | — | — | — | MMA(100) | V65(0.1) |

| Example | Polymerizable monomer (parts by weight) (A) | Mol average for (A) | (B) | (C) | Compound having functional group (parts by weight) ($D_C$) | ($D_S$) | ($D_E$) | ($D_A$) | (E) | Polymerization initiator (parts by weight) |
|---|---|---|---|---|---|---|---|---|---|---|
| 15 | 4EG(40) 9EG(10) | N = 4.65 | St(50) | — | MAA(3) | — | — | — | — | V65(0.1) |
| 16 | 4EG(40) 9EG(10) | N = 4.65 | St(50) | — | — | MOPS-M (0.005) | — | — | — | V65(0.1) |
| 17 | 4EG(40) 9EG(10) | N = 4.65 | St(50) | — | — | — | GMA(2) | — | — | V65(0.1) |
| 18 | 4EG(40) 9EG(10) | N = 4.65 | St(50) | — | — | — | — | 40EM(5) | — | V65(0.1) |
| 19 | 4EG(40) 9EG(10) | N = 4.65 | St(50) | — | — | MOPS-M (0.001) | GMA(1) | — | — | V65(0.1) |
| 20 | 4EG(40) 9EG(10) | N = 4.65 | St(50) | — | MAA(5) | — | — | 200PA(10) | — | V65(0.1) |
| 21 | 4EG(50) | N = 4 | St(50) | — | — | — | — | 200PA(3) | GPP(2) | V60(0.1) V40(0.05) |

TABLE 2

| Example | Appearance | Refractive index | Abbe's number | Entire light transmittance (%) | Specific gravity |
|---|---|---|---|---|---|
| 1 | good | 1.553 | 40.9 | 92 | 1.14 |
| 2 | good | 1.553 | 38.0 | 92 | 1.14 |
| 3 | good | 1.550 | 41.3 | 92 | 1.13 |
| 4 | good | 1.549 | 37.1 | 92 | 1.14 |
| 5 | good | 1.540 | 38.3 | 92 | 1.14 |
| 6 | good | 1.553 | 39.5 | 92 | 1.14 |
| 7 | good | 1.563 | 36.3 | 91 | 1.13 |
| 8 | good | 1.549 | 37.1 | 92 | 1.13 |
| 9 | good | 1.553 | 37.0 | 92 | 1.14 |
| 10 | good | 1.537 | 44.4 | 91 | 1.14 |
| 11 | good | 1.547 | 42.7 | 91 | 1.13 |
| 12 | good | 1.546 | 42.8 | 91 | 1.13 |
| 13 | good | 1.549 | 42.3 | 91 | 1.14 |
| 14 | good | 1.547 | 42.8 | 91 | 1.15 |
| Comp. Example 1 | good | 1.502 | 54.9 | 92 | 1.16 |
| Comp. Example 2 | good | 1.561 | 38.9 | 91 | 1.13 |
| Comp. Example 3 | good | 1.498 | 58.8 | 91 | 1.32 |
| Comp. Example 4 | good | 1.491 | 57.8 | 92 | 1.13 |
| 15 | good | 1.552 | 40.8 | 91 | 1.14 |
| 16 | good | 1.553 | 40.9 | 92 | 1.14 |
| 17 | good | 1.553 | 41.2 | 91 | 1.14 |
| 18 | good | 1.552 | 41.2 | 92 | 1.14 |
| 19 | good | 1.553 | 40.9 | 91 | 1.14 |
| 20 | good | 1.550 | 41.5 | 91 | 1.15 |
| 21 | good | 1.547 | 41.5 | 91 | 1.14 |

TABLE 3

| Example | Polymerizable monomer (parts by weight) (A) | Mol average for (A) | (B) | (C) | ($D_C$) | ($D_S$) | ($D_E$) | ($D_A$) | (E) | Polymerization initiator (parts by weight) |
|---|---|---|---|---|---|---|---|---|---|---|
| 22 | 4EG(40) 9EG(10) | N = 4.65 | St(50) | — | MAA(5) | — | — | — | — | LPO(0.2) BEH(0.1) |
| 23 | 4EG(40) 9EG(10) | N = 4.65 | St(50) | — | — | MOPS-M (0.005) | — | — | — | LPO(0.2) BEH(0.1) |
| 24 | 4EG(40) 9EG(10) | N = 4.65 | St(50) | — | — | — | GMA(2) | — | — | LPO(0.2) BEH(0.1) |
| 25 | 4EG(40) 9EG(10) | N = 4.65 | St(50) | — | — | — | — | 40EM(5) | — | LPO(0.2) BEH(0.1) |
| 26 | 4EG(40) 9EG(10) | N = 4.65 | St(50) | — | — | MOPS-M (0.001) | GMA(1) | — | — | LPO(0.2) BEH(0.1) |
| 27 | 4EG(40) 9EG(10) | N = 4.65 | St(50) | — | MAA(5) | — | — | 200PA(10) | — | LPO(0.2) BEH(0.1) |
| 28 | 4EG(40) 14EG(10) | N = 4.97 | St(50) | — | — | — | — | 40EM(3) | — | LPO(0.2) BEH(0.1) |
| 29 | 3EG(10) 4EG(40) | N = 3.78 | St(40) | BzMA(10) | — | MOPS-M (0.005) | GMA(5) | — | — | LPO(0.2) |
| 30 | 3EG(10) 4EG(40) | N = 3.78 | St(40) | BzMA(10) | — | — | — | — | BPPP(15) | LPO(0.2) BEH(0.1) |
| 31 | 3EG(40) | N = 3.0 | St(30) α-St(20) | BzMA(10) | — | MOPS-M (1.5) | — | — | — | LPO(0.2) BEH(0.1) |
| 32 | 4EG(40) | N = 4 | St(20) α-St(20) | BzMA(20) | — | — | — | — | GPP(25) | LPO(0.2) BEH(0.1) |
| 33 | 4EG(40) | N = 4 | St(20) α-St(20) | BzMA(20) | — | — | — | HEMA(5) | — | LPO(0.2) BEH(0.1) |
| 34 | 4EG(40) | N = 4 | St(20) α-St(20) | BzMA(20) | — | — | — | HEMA(15) | — | LPO(0.2) BEH(0.1) |
| 35 | 4EG(20) 9EG(20) | N = 5.88 | St(20) α-St(15) | BG(10) BzMA(15) | AA(2) | — | — | 200PA(5) | — | LPO(0.2) BEH(0.1) |
| 36 | 4EG(40) | N = 4 | St(50) | ADC(5) MMA(5) | — | — | — | — | CPS-M (0.003) | LPO(0.2) BEH(0.1) |
| Comp. Example 5 | — | N = 1 | St(50) | EG(50) | — | — | — | 40EM(3) | — | LPO(0.2) BEH(0.1) |
| Comp. Example 6 | — | — | St(70) | MMA(30) | — | — | — | 40EM(3) | — | LPO(0.2) BEH(0.1) |
| Comp. Example 7 | — | — | St(50) | 23EG(50) | — | — | — | 40EM(3) | — | LPO(0.2) BEH(0.1) |
| Comp. Example 8 | 4EG(40) 9EG(10) | — | St(50) | — | — | — | — | — | — | LPO(0.2) BEH(0.1) |
| Comp. Example 9 | 4EG(40) 9EG(10) | — | St(50) | — | MAA(5) | — | — | — | — | LPO(0.2) BEH(0.1) |

TABLE 4

| Example | Gasket used | Appearance (yield) | Cutting processability | Heat resistance 100° C. | Heat resistance 120° C. | Diopter (D) | Impact resistance (g × cm/mm) |
|---|---|---|---|---|---|---|---|
| 22 | A | good (19/20) | ○ | ○ | ○ | −3.0 | 95 × 100/1.5 (0.93J) |
| 23 | A | good (19/20) | ○ | ○ | ○ | −3.0 | 95 × 100/1.5 (0.93J) |
| 24 | A | good (19/20) | ○ | ○ | ○ | −3.0 | 95 × 100/1.5 (0.93J) |
| 25 | A | good (20/20) | ○ | ○ | ○ | −3.0 | 95 × 100/1.5 (0.93J) |
| 26 | A | good (20/20) | ○ | ○ | ○ | −3.0 | 95 × 100/1.5 (0.93J) |
| 27 | B | good (20/20) | ○ | ○ | ○ | −3.0 | 50 × 127/1.5 (0.62J) |
| 28 | B | good (18/20) | ○ | ○ | ○ | −3.0 | 95 × 127/1.5 (1.18J) |
| 29 | A | good (20/20) | ○ | ○ | ○ | −3.0 | 50 × 120/1.5 (0.59J) |
| 30 | A | good (15/20) | ○ | ○ | ○ | −3.0 | 50 × 120/1.5 (0.59J) |
| 31 | A | good (15/20) | ○ | ○ | ○ | −3.0 | 16.2 × 127/1.5 (0.20J) |
| 32 | C | good (16/20) | ○ | ○ | X deformed | −3.0 | 50 × 100/1.5 (0.49J) |
| 33 | C | good (15/20) | ○ | ○ | ○ | −3.0 | 50 × 100/1.5 (0.49J) |
| 34 | C | good (18/20) | ○ | ○ | ○ | −3.0 | 50 × 100/1.5 (0.49J) |
| 35 | C | good (19/20) | ○ | ○ | ○ | −3.0 | 95 × 100/1.5 (0.93J) |
| 36 | A | good (18/20) | ○ | ○ | ○ | −3.0 | 50 × 127/1.5 (0.62J) |
| Comp. Example 5 | A | good (12/20) | X chipped | ○ | ○ | −3.0 | FDA failed (less than 0.20J) |
| Comp. Example 6 | A | good (18/20) | X fused | X deformed | X deformed | — | — |
| Comp. Example 7 | A | good (19/20) | ○ | X deformed | X deformed | — | — |
| Comp. Example 8 | A | surface condition poor (0/20) | — | — | — | — | — |
| Comp. Example 9 | D | lens clouded | — | — | — | — | — |

What is claimed is:

1. An optical material having low specific gravity and excellent impact resistance consisting of the resin obtained by radical polymerization of:

(A) from 35 to 70% by weight of one or more difunctional (meth)acrylates represented by the following general formula (fA)

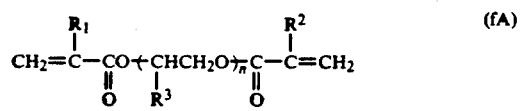

wherein $R^1$, $R^2$ and $R^3$ represent respectively and independently H or $CH_3$ and n is an integer of 3 to 18, (B) from 25 to 60% by weight of one or more aromatic vinyl monomers, (C) from 5 to 35% by weight of one or more polymerizable oligomers or monomers selected from the group consisting of monofunctional (meth)acrylates and polyfunctional (meth)acrylates, each of which has a molecular weight greater than 98 and a SP (solubility parameter) value from 8.0 to 9.3 $(cal/cm^3)^{\frac{1}{2}}$, excepting the compounds of (A) and (B), and (D) at least ($D_S$) and/or ($D_A$) of the polymerizable oligomers or monomers selected from the group consisting of ($D_S$), ($D_E$), ($D_A$) and ($D_C$), wherein ($D_S$): is a polymerizable oligomer or monomer having at least both an alkoxysilyl group and a radical polymerizable double bond in a molecule, in an amount from 0.0001 to 0.5 parts by weight based on 100 parts by weight of the total amount of ingredients (A), (B) and (C), ($D_E$): is a polymerizable oligomer or monomer having at least both an epoxy group and a radical polymerizable double bond in a molecule, in an amount from 0.1 to 20 parts by weight based on 100 parts by weight of the total amount of ingredients (A), (B) and (C), ($D_A$): is a polymerizable oligomer or monomer having at least both an alcoholic hydroxy group and a radical polymerizable double bond in a molecule, in an amount from 0.1 to 20 parts by weight based on 100 parts by weight of the total amount of ingredients (A), (B) and (C), and ($D_C$): is a polymerizable oligomer or monomer having at least both a carboxylic group and a radical polymerizable double bond in a molecule, in an amount from 0.1 to 10 parts by weight based on 100 parts by weight of the total amount of ingredients (A), (B) and (C).

2. An optical material as defined in claim 1, wherein component (D) comprises at least ($D_S$) and/or ($D_A$), and the amount of the ingredients ($D_S$), ($D_E$), ($D_A$) and ($D_C$) are each as follows, ($D_S$): 0.001 to 0.2 parts by weight based on 100 parts by weight of the total amount of the ingredients (A), (B) and (C), ($D_E$): 1 to 10 parts by weight based on 100 parts by weight of the total amount of the ingredients (A), (B) and (C), ($D_A$): 1 to 10 parts by weight based on 100 parts by weight of the total amount of the ingredients (A), (B) and (C), and ($D_C$): 0.5 to 8 parts by weight based on 100 parts by weight of the total amount of the ingredients (A), (B) and (C).

3. An optical material as defined in claim 1 or 2, wherein the alcoholic hydroxy group of ($D_A$) is a secondary or tertiary alcoholic hydroxy group.

4. An optical material having low specific gravity and excellent impact resistance consisting of a resin obtained by radical polymerization of:

(A) from 35 to 70% by weight of one or more difunctional (meth)acrylates represented by the following formula (fA),

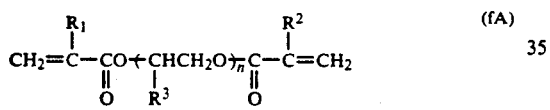

wherein $R^1$, $R^2$, and $R^3$ represent respectively and independently H or $CH_3$ and n is an integer of 3 to 18, (B) from 25 to 60% by weight of one or more aromatic vinyl monomers, (C) from 5 to 35% weight of one or more polymerizable oligomers or monomers selected from the group consisting of monofunctional (meth)acrylates or poly-functional (meth)acrylates, each of which has a molecular weight of greater than 98 and a SP (solubility parameter) value from 8.0 to 9.3 $(cal/cm^3)^{\frac{1}{2}}$, excepting the compounds of (A) and (B), and (E) at least ($E_S$) and/or ($E_A$) of the compounds selected from the group consisting ($E_S$), ($E_E$), ($E_A$) and ($E_C$), wherein ($E_S$): is a compound having at least an alkoxysilyl group and not having a radical polymerizable double bond in a molecule, in an amount from 0.0001 to 0.5 parts by weight based on 100 parts by weight of the total amount of the ingredients (A), (B) and (C), ($E_E$): is a compound having at least an epoxy group and not having a radical polymerizable double bond in a molecule, in an amount from 0.1 to 20 parts by weight based on 100 parts by weight of the total amount of the ingredients (A), (B) and (C), ($E_A$): is a compound having at least an alcoholic hydroxy group and not having a radical polymerizable double bond in a molecule, in an amount from 0.1 to 20 parts by weight based on 100 parts by weight of the total amount of the ingredients (A), (B) and (C), and ($E_C$): is a compound having at least a carboxylic group and not having a radical polymerizable double bond in a molecule, in an amount from 0.1 to 10 parts by weight based on 100 parts by weight of the total amount of the ingredients (A), (B) and (C).

5. An optical material as defined in claim 4, wherein component (E) comprises at least ($E_S$) and/or ($E_A$), and the amount of the compounds ($E_S$), ($E_E$), ($E_A$) and ($E_C$) are as follows, ($E_S$): 0.001 to 0.2 parts by weight based on 100 parts by weight of the total amount of the ingredients (A), (B) and (C), ($E_E$): 1 to 10 parts by weight based on 100 parts by weight of the total amount of the ingredients (A), (B) and (C), ($E_A$): 1 to 10 parts by weight based on 100 parts by weight of the total amount of the ingredients (A), (B) and (C), and ($E_C$): 0.5 to 8 parts by weight based on 100 parts by weight of the total amount of the ingredients (A), (B) and (C).

6. An optical material as defined in claim 4 or 5, wherein the alcoholic hydroxy group is a secondary or tertiary alcoholic hydroxy group.

* * * * *

UNITED STATES PATENT AND TRADEMARK OFFICE
CERTIFICATE OF CORRECTION

PATENT NO. : 5,132,384

DATED : July 21, 1992

INVENTOR(S) : Tatsuhito Matsuda et al.

It is certified that error appears in the above-identified patent and that said Letters Patent is hereby corrected as shown below:

On the Title page, item [75],

The second inventor's name is incorrect, should be, --Yasuaki Funae--.

Signed and Sealed this

Seventeenth Day of August, 1993

*Attest:*

BRUCE LEHMAN

*Attesting Officer*       *Commissioner of Patents and Trademarks*